US008495166B2

(12) United States Patent
Perantatos et al.

(10) Patent No.: US 8,495,166 B2
(45) Date of Patent: Jul. 23, 2013

(54) OPTIMIZED CACHING FOR LARGE DATA REQUESTS (75) Inventors: George Perantatos, Seattle, WA (US); Suyog M. Gadgil, Redmond, WA (US); Glen Buhlmann, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 12/764,319

(22) Filed: Apr. 21, 2010

(65) Prior Publication Data
US 2011/0264759 A1 Oct. 27, 2011

(51) Int. Cl.
*G06F 15/167* (2006.01)
*G06F 15/16* (2006.01)

(52) U.S. Cl.
USPC .......................................... 709/213; 709/217

(58) Field of Classification Search
USPC .................... 709/212–219, 223–226, 229
See application file for complete search history.

(56) References Cited

U.S. PATENT DOCUMENTS

| 6,064,406 A | 5/2000 | Atkinson et al. | |
|---|---|---|---|
| 6,167,438 A * | 12/2000 | Yates et al. | 709/216 |
| 6,377,974 B1 * | 4/2002 | Feigenbaum | 709/203 |
| 6,505,058 B1 * | 1/2003 | Willey | 455/574 |
| 6,591,288 B1 * | 7/2003 | Edwards et al. | 709/203 |
| 6,735,434 B2 * | 5/2004 | Criss et al. | 455/418 |
| 6,957,219 B1 * | 10/2005 | Lin et al. | 1/1 |
| 7,392,345 B2 | 6/2008 | Pardikar et al. | |
| 7,890,779 B2 * | 2/2011 | Kim et al. | 713/300 |
| 2002/0007392 A1 * | 1/2002 | Buddhikot et al. | 709/203 |
| 2003/0149659 A1 * | 8/2003 | Danaher et al. | 705/38 |
| 2003/0154244 A1 * | 8/2003 | Zellers et al. | 709/203 |
| 2003/0187935 A1 * | 10/2003 | Agarwalla et al. | 709/206 |
| 2004/0133630 A1 * | 7/2004 | Coles et al. | 709/202 |
| 2005/0144325 A1 | 6/2005 | Palevich et al. | |
| 2005/0177635 A1 * | 8/2005 | Schmidt et al. | 709/226 |
| 2006/0069769 A1 * | 3/2006 | Dacosta | 709/224 |
| 2008/0028085 A1 * | 1/2008 | Venkatavaradan et al. | 709/229 |
| 2008/0040445 A1 * | 2/2008 | Sullivan et al. | 709/217 |
| 2008/0155051 A1 * | 6/2008 | Moshayedi | 709/213 |
| 2008/0162820 A1 | 7/2008 | Kasten et al. | |
| 2009/0138477 A1 * | 5/2009 | Piira et al. | 707/10 |

FOREIGN PATENT DOCUMENTS

JP 2009025887 A * 2/2009

OTHER PUBLICATIONS

Newton's Telecom Dictionary, 18 ed., Feb. 2002.*
"Application Request Routing", Retrieved at << https://www.iis.net/expand/ApplicationRequestRouting >>, 2010, pp. 2.
"Content Caching and Retrieval System Overview", Retrieved at << http://download.microsoft.com/download/C/6/C/C6C3C6F1-E84A-44EF-82A9-49BD3AAD8F58/[MS-CCRSO].pdf >>,NT Secrets, 2009, pp. 1-83.
Meier, et al., "Improving ASP.NET Performance", Retrieved at << http://msdn.microsoft.com/en-us/library/ms998549. aspx#scalenetchapt06_topic14 >>, Microsoft Patterns & practices, May 2004, pp. 7.

* cited by examiner

*Primary Examiner* — Brendan Higa
(74) *Attorney, Agent, or Firm* — Turk IP Law, LLC (57) ABSTRACT

An optimized caching mechanism for byte range requests from a web service is provided. When a large file that is not already in cache or being transferred is requested, a background thread may be created to transfer the file and a shared data structure created to track portions of the file that are transferred. For each subsequent request for portions of the same file, the data may be sent back in chunks and the request to read each chunk from the file blocked until that chunk is filled by the background thread. Thus, the locally stored and partially filled file is shared among multiple requestors.

18 Claims, 6 Drawing Sheets

OPTIMIZED CACHING FOR LARGE DATA REQUESTS

BACKGROUND

One of the major contributions of computers and software to people's daily lives was the automation of widely used tasks such as word processing, spreadsheet calculations, and diagramming. Not only did these applications automate and make various tasks usable by anyone, but they also added many new capabilities in manipulating a wide range of documents and data. Until recently, a typical environment included a standalone or networked computer with a particular application installed on it. Thus, the user was working with an application installed and executed on their local computer using data also stored locally. A recent trend in providing the computing capabilities without the burden of having a full scale application installed on the user's computer is enabling users to perform the computerized tasks through web access. In a typical web service, the user may utilize a hosted service to create new documents, manipulate existing ones, and perform many other computing tasks through a networked medium such as the Internet.

In a typical web service, a front end server may make available relatively large files which may be requested via byte range requests. The files may be stored externally (database, remote storage, etc.) and cached at a front end server when requested by a client. File content may be served to a requesting client as the file is being copied into the cache since copying the entire file can take amount of significant time. A challenge may be presented if multiple clients concurrently request byte ranges in the same large file. If the web server attempts to fetch the file multiple times from the external storage, the operation(s) may place unnecessary load on the external storage and waste local disk space on the web server. Alternatively, clients may have to wait their turn slowing the service speed.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an optimized caching mechanism for byte range requests from a web service. In response to a first request for a large file, a background thread may be created to transfer the file and a shared data structure created to track portions of the file that are transferred. For each subsequent request for portions of the same file, the data may be sent back in chunks and the request to read each chunk from the file blocked until that chunk is actually present (i.e. filled by the background thread).

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, in response to a first request for a large file a background thread may be created to transfer the file and a shared data structure created to track transferred portions of the file. Data may be sent back in chunks for each subsequent request for the same file. A request to read a chunk from the file may block a thread until the requested chunk is filled by the background thread. Since each request is on a separate thread, a thread that blocks while waiting for its required data does not block any of the other threads if the data they require is already present enabling facilitation of multiple requests for the same file synchronously. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for managing web service operations. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network.

Figure 1:
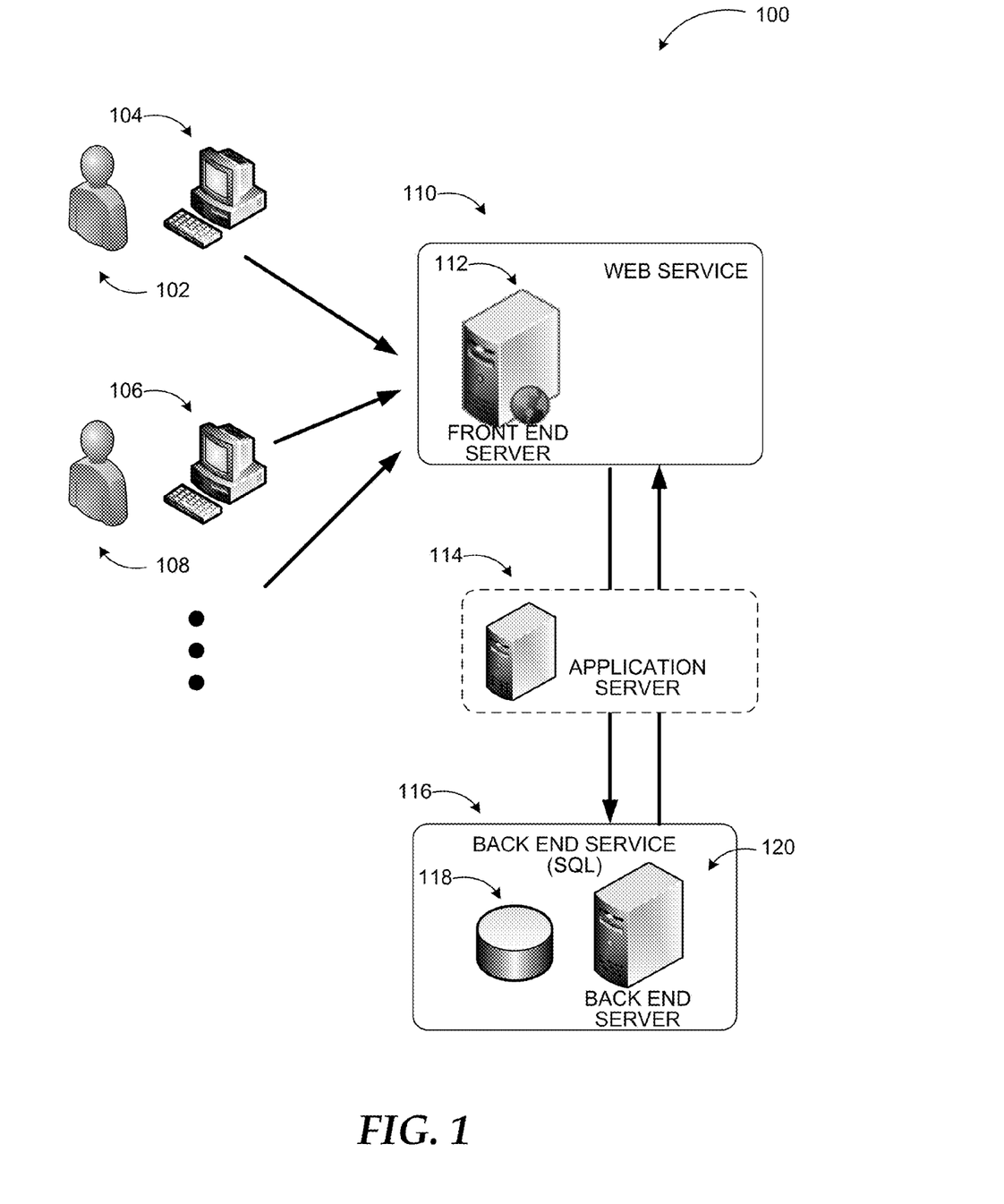
FIG. 1 is a conceptual diagram illustrating an example web service structure, where embodiments may be implemented.

Referring to FIG. 1, conceptual diagram 100 of an example web service structure, where embodiments may be implemented, is illustrated. In the example system 100 of FIG. 1, web service 110 is accessible to users 102, 108 through networked communication between their client devices 104, 106 and front end server 112. Typically, users 102, 108 may access web service 110 through a browsing application or comparable applications executed on the client devices 104, 106. Client devices 104, 106 may include any computing device capable of communicating with other computing devices over one or more networks. Such devices may include, but are not limited to, desktop computers, laptop computers, handheld computers, mobile computers, terminals, smart phones, and comparable ones. Front end server 112 may receive user requests, retrieve relevant data from back end service 116, execute programs associated with the requests, and provide results back to users 102, 108.

Back end service 116 may store data associated with the web service 110, as well as perform at least some of the computations (e.g. resource heavy background computations, updates to data store(s), etc.). Back end service 116 may include a number of data stores (e.g. data store 118) and servers (e.g. back end server 120) managing the data stores. Data store 118 may include any form of data storage including, but not limited to, databases, tables, spreadsheets, multidimensional data stores, and comparable ones. The front end and the back end of the web service may be centralized or distributed (physically or virtually in separate locations), and different portions of the web service may be implemented through a variety of computing devices. Web service 110 may optionally include application server 114 for executing applications requested by a user. Different components of web service 110 may communicate with each other through a number of protocols over one or more networks.

Figure 2:
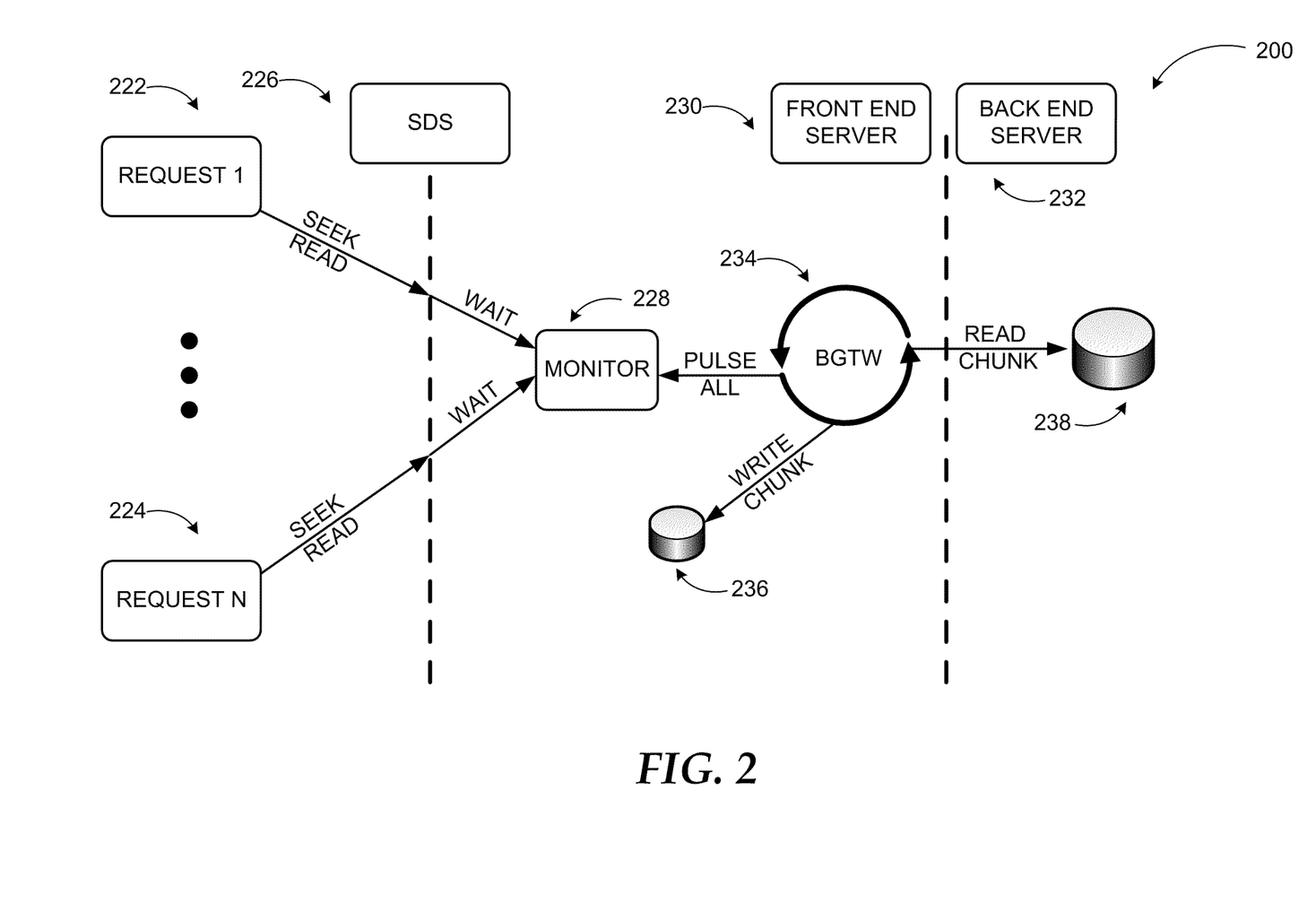
FIG. 2 is a diagram illustrating interactions between various components of a web service according to embodiments.

FIG. 2 includes diagram 200 illustrating interactions between various components of a web service according to embodiments. According to the example embodiments illustrated in diagram 200, a first request 222 for a large file may start a background thread write (BGTW) 234 to transfer the file from back end storage 238 (managed by back end server 232) to a local temporary storage 236 (at the front end server 230). A shared data structure (SDS) 226 may be created in a central location (e.g. front end server 230 or another server associated with the web service) to track the status of this transfer including which portions of the file have been transferred so far.

An interface may be provided to the clients on the SDS 226, which requestors may use to seek within the file and read data from the local temporary storage 236. Subsequent requests (e.g. request 224) that are received for the same file may find the SDS 226 and use the interface to seek to desired locations in the file and read data. SDS 226 may employ a monitor 228, which may enable multiple read clients to block and be woken up by the BGTW 234 each time new data is available. This allows the seek and read methods of the interface to block if the requested data is not present and then unblock once the methods are woken up and determine that the requested data is present.

Thus, a system according to some embodiments may enable fetching of large files from a back end data store asynchronously and storing in a local disk file both from the beginning of the file and the end of the file such that data consumers like media players can seek to the end of the file and read the last few data chunks before the entire file is fetched. Moreover, the system enables multiple requests to request data from the single, shared, locally stored file.

Figure 3:
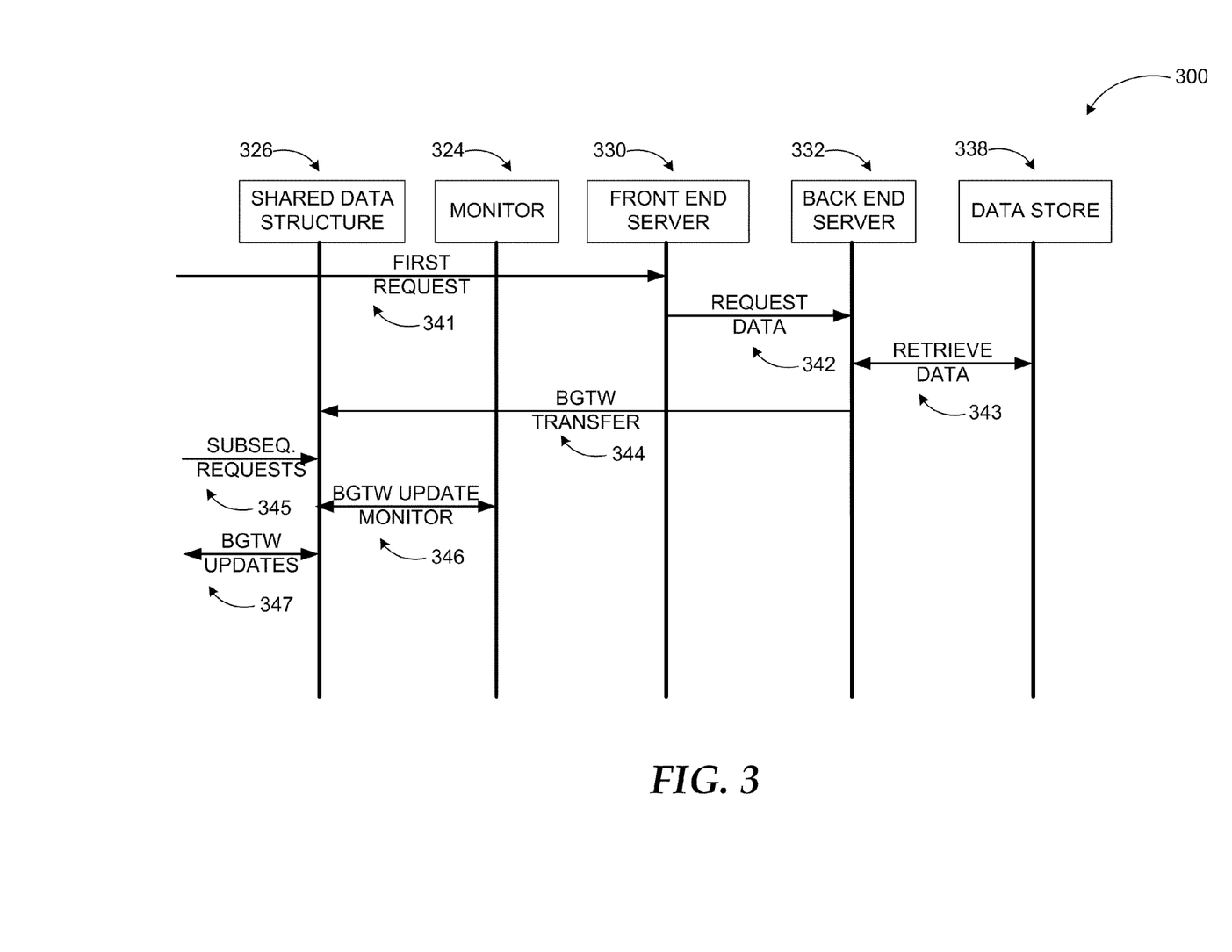
FIG. 3 is a sequence diagram illustrating data flow during processing of data requests in a web service according to embodiments.

FIG. 3 is a sequence diagram illustrating data flow during processing of data requests in a web service according to embodiments. As discussed above, a web service according to embodiments may employ a shared data structure 326 created at a front end server 330 and a monitor 324 to retrieve a large file from a back end data store 338 through back end server 332, maintain a local shared copy, and enable multiple clients to access and retrieve the chunks of the shared copy at the same time.

According to an example interaction scenario shown in diagram 300, front end server 330 requests data (342) from the back end server 332 in response to receiving a first request (341). The front end server 330 may start a background thread write and begin transferring the data from the back end server 332 to a newly created shared data structure 326 at the front end server 330 (344) once the back end server 332 retrieves the data from data source 338 and renders available (343) in chunks.

Subsequent requests may be received from clients (345) at the SDS and handled through background thread write updates and the SDS monitor 324 (346) such that multiple seek and read methods of the SDS interface may block if the requested data is not yet present and unblock when background thread write updates (347) are received (new data chunks written).

Data retrieval may be managed through a system of callbacks (e.g. seek and read methods) by the code on the front end server. Similarly, errors and hangs may also be handled. If one or more data chunks fail to be received from the back end, a complete request may fail and an error may be returned to the end user.

Components and actions in diagrams 200 and 300 are for illustration purposes only, and do not constitute a limitation on embodiments. Other components, software or hardware, and configuration may be employed for providing optimized caching of large data files in a web service.

The above discussed scenarios, example systems, applications, and data structures are also for illustration purposes. Embodiments are not restricted to those examples. Other applications, web service configurations, data structures, and operation orders may be used in implementing a web service with optimized caching for multiple request availability in a similar manner using the principles described herein.

Figure 4:
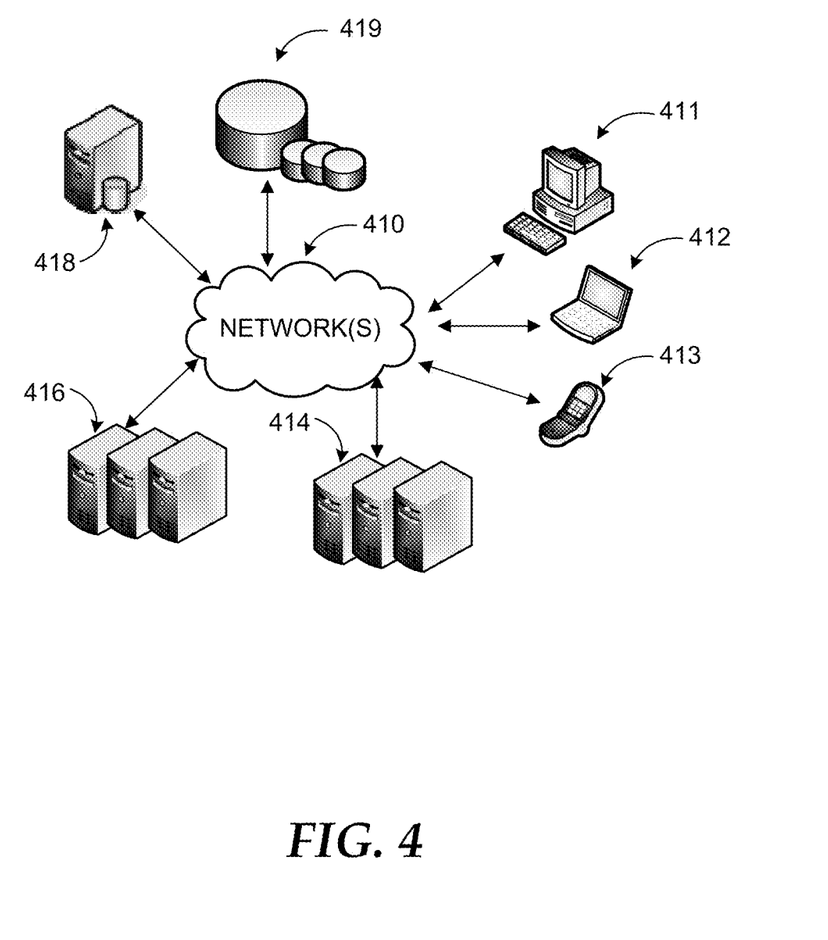
FIG. 4 is a networked environment, where a system according to embodiments may be implemented.

FIG. 4 is an example networked environment, where embodiments may be implemented. A platform providing optimized caching for large data requests in a web service environment may be implemented via software executed over one or more servers 414 such as a hosted service. The platform may communicate with client applications (e.g. browsers) on individual computing devices such as a smart phone 413, a laptop computer 412, and desktop computer 411 (client devices) through network(s) 410. The web front end service may communicate with diagram services back end executed on a separate group of servers 416.

As discussed above, a shared data structure and background thread write may be employed in conjunction with a monitor to enable multiple users request and receive byte range data requests for large data files from the back end of a web service. Web service data may be stored in one or more data stores (e.g. data stores 419), which may be managed by any one of the servers 416 (e.g. a back end server) or by database server 418.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a system for providing optimized caching for byte range data requests in a web service. Furthermore, the networked environments discussed in FIG. 4 are for illustration purposes only. Embodiments are not limited to the example applications, modules, or processes.

Figure 5:
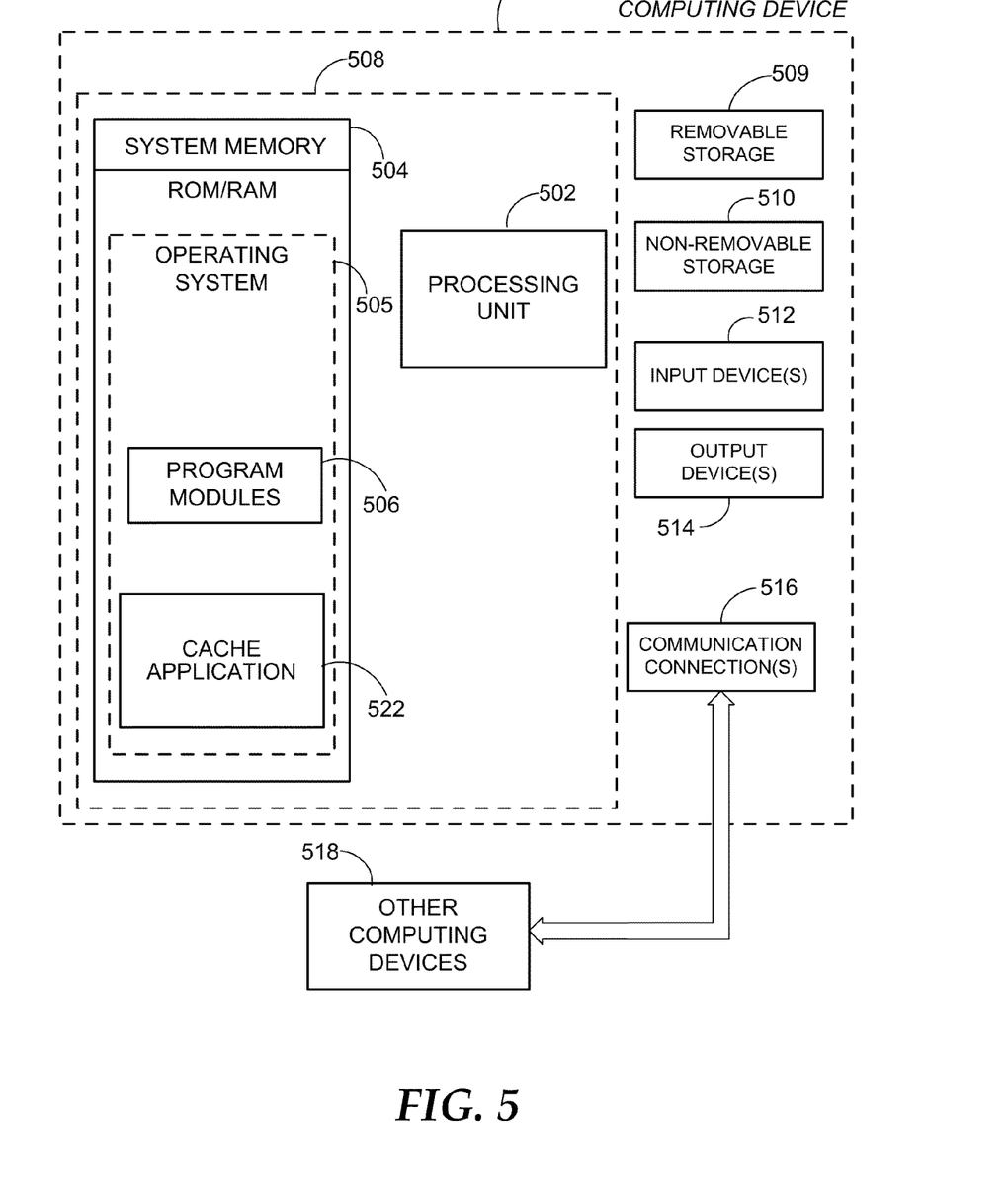
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a front end server of a web service providing data to client browsers and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506 and cache application 522.

Cache application 522 may manage byte range data requests from multiple clients for large data files maintained by the web service and enable efficient delivery of data through a shared data structure, a background thread write process, and a monitor as discussed previously. Cache application 522 may be a separate application or an integral module of a hosted web based service that provides access to large data files among other things to client applications/devices. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, host service servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
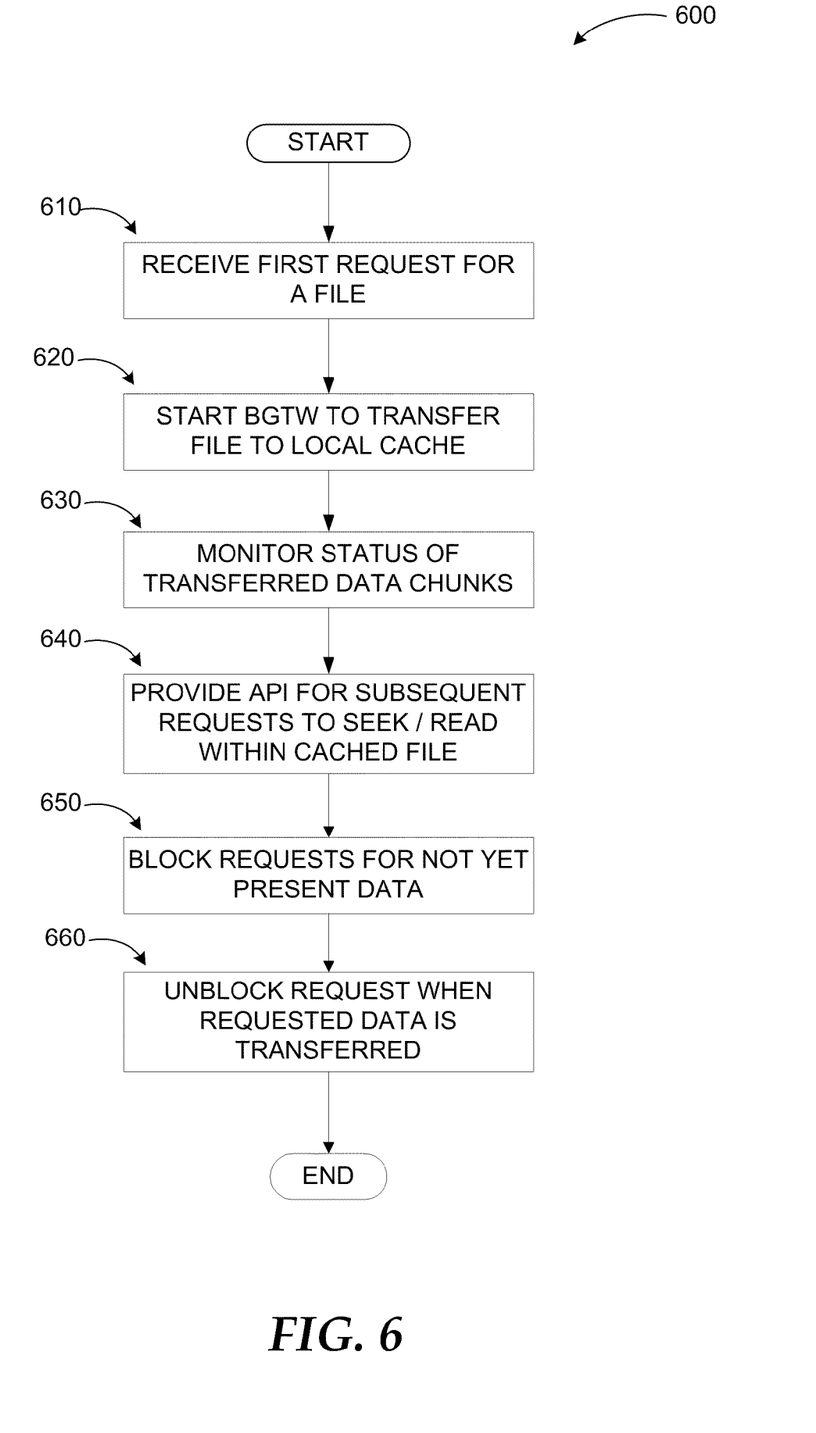
FIG. 6 illustrates a logic flow diagram for a process of processing data requests in a web service according to embodiments.

FIG. 6 illustrates a logic flow diagram for process 600 of processing data requests in a web service according to embodiments. Process 600 may be implemented as part of a web service as discussed in FIG. 2.

Process 600 begins with operation 610, where a first request for a file at the back end storage of the service is received by the front end server of the service. In response to the first request, a background thread write is started for transferring the requested file to a local cache at operation 620. A shared data structure (SDS) may be created and status of transferred data chunks monitored at operation 630.

At operation 640, an application programming interface (API) may be provided on the SDS to enable subsequent requests seek within the locally cached filed and read data from the same file. Any subsequent requests may be directed to the SDS API for seek and read operations. Optional operations 650 and 660 represent blocking of seek and read methods based on subsequent requests for the same file if requested data has not yet been transferred to the local cache or unblocking (or waking up) the same methods if the requested data has been transferred after the methods were blocked. The local cache may be deleted after a predefined period of lack of requests for the transferred file.

The operations included in process 600 are for illustration purposes. Optimized caching for large data requests in a web service may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a computing device for optimized caching to accommodate multiple requests in a web service, the method comprising:
   in response to receiving a first request for a file, creating a background thread for transferring the file from a back end data store to a temporary local data store at a front end of the web service;
   creating a shared data structure (SDS) for tracking portions of the file transferred to the temporary local data store;
   creating a new thread for each subsequent request associated with portions of the file such that multiple requests are accommodated for transferred portions of the file and requests for not-yet-transferred portions of the file are blocked;
   creating a monitor associated with the SDS for monitoring a status of file transfer from the back end to the temporary local data store;
   employing the monitor to enable multiple clients of the web service to block and be woken up each time new data is available at the back end data store; and
   transmitting an error to a user subsequent to a failure to receive at least one of the portions from the back end data store.

2. The method of claim 1, wherein the background thread is employed by a background thread write (BGTW) process that is configured to wake up a blocked request upon determining that a portion of the file associated with the blocked request is transferred.

3. The method of claim 1, further comprising:
   enabling the multiple clients of the web service to seek through the transferred portions of the file at the same time employing the monitor.

4. The method of claim 1, further comprising:
   enabling the multiple clients of the web service to read the transferred portions of the file at the same time employing the monitor.

5. The method of claim 1, further comprising:
   providing an interface at the SDS for the subsequent requests.

6. The method of claim 5, wherein the interface is an Application Programming Interface (API).

7. The method of claim 1, further comprising:
   transferring the portions of the file beginning from a beginning and from an end of the file.

8. The method of claim 1, wherein the temporary local data store is a cache at a front end server of the web service.

9. A system for executing a web service employing optimized cache for large data requests, the system comprising:
   a back end data store for storing a file;
   a web front end (WFE) server configured to:
      in response to receiving a first request for the file, create a background thread for asynchronously transferring a single copy of the file from the back end data store to a local cache at the WFE;
      create a shared data structure (SDS) for tracking portions of the requested file transferred to the local cache;
      provide an interface at the SDS for subsequent requests for the file;
      for each subsequent request received at the SDS interface, create a new thread such that multiple requests for the file are accommodated for transferred portions of the file and requests for not-yet-transferred portions of the file are blocked;
      create a monitor associated with the SDS for monitoring a status of file transfer from the back end data store to the temporary local data store;
      employ the monitor to enable multiple clients of the web service to block and be woken up each time new data is available at the back end data store;
      utilize the SDS interface to seek to desired locations in the file and read data for each subsequent request;
      block seek and read methods of the SDS interface if requested data is not present and then unblock once the methods are woken up and the requested data is determined to be present at the temporary local data store; and
   a back end server configured to:
      manage asynchronous copying of the file from the back end data store to the WFE.

10. The system of claim 9, wherein the WFE is further configured to:
    unblock blocked requests upon determining a requested portion to be transferred to the local cache.

11. The system of claim 9, wherein the SDS is configured to accommodate byte range requests by transferring portions of the file from a beginning of the file and from an end of the file.

12. The system of claim 9, further comprising an application server coupled to the WFE and the back end server, the application server arranged to execute one or more applications associated with received requests.

13. The system of claim 9, wherein the back end data store includes at least one from a set of: a database, a table, a spreadsheet, and a multi-dimensional data store.

14. The system of claim 9, wherein the WFE and the back end server are implemented in one of a centralized manner and a distributed manner.

15. A computer-readable memory device with instructions stored thereon for providing a web service with optimized caching for large data requests, the instructions comprising:
    receiving a first request for a file stored at a back end data store of the web service;
    creating a background thread for asynchronously transferring a single copy of the file from the back end data store to a local cache at a front end server of the web service;
    creating a shared data structure (SDS) and a monitor process for the SDS to track portions of the file transferred to the local cache;

employing the monitor to enable multiple clients of the web service to block and be woken up each time new data is available at the back end data store;

providing an interface at the SDS for subsequent requests for the file;

enabling multiple seek and read requests for the file by creating a new thread for each subsequent request, wherein requests for not-yet-transferred portions of the file are blocked until a requested portion is transferred to the local cache;

unblocking the requests once methods of the interface are woken up and the requested data is determined to be present at the local cache;

utilizing the SDS interface to seek to desired locations in the file and read data for each subsequent request; and transmitting an error to a user subsequent to a failure to receive at least one of the portions from the back end data store.

16. The computer-readable memory device of claim 15, wherein the seek and read requests are submitted as callback methods from the SDS monitor to a background thread write (BGTW) process.

17. The computer-readable memory device of claim 15, wherein the file is a media file and the requests are byte range requests accommodated by copying portions of the media file from a beginning and an end of the file.

18. The computer-readable memory device of claim 15, wherein the instructions further comprise deleting the local cache after a predefined period of lack of requests for the file.

* * * * *